No. 744,184. PATENTED NOV. 17, 1903.
F. F. FREED.
MANURE SPREADER.
APPLICATION FILED MAR. 16, 1903.
NO MODEL. 2 SHEETS—SHEET 1.
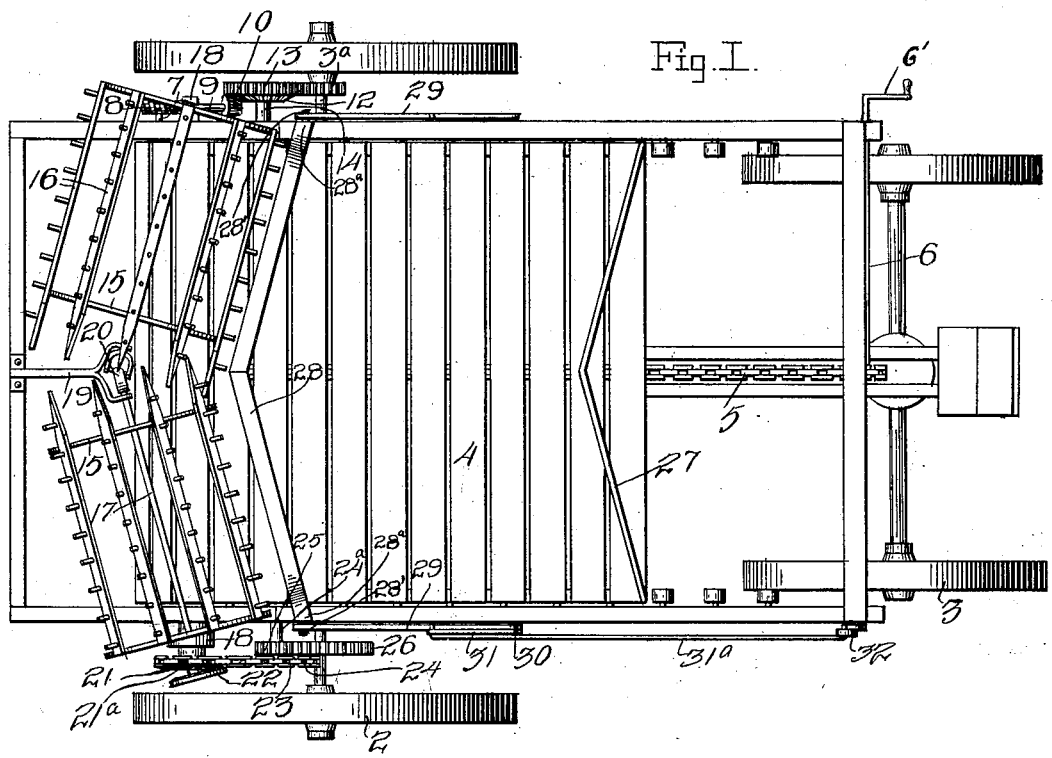
Inventor
Frank F. Freed.
Witnesses
E. R. Reichenbach
J. W. Wilson
By H. B. Wilson
Attorney.

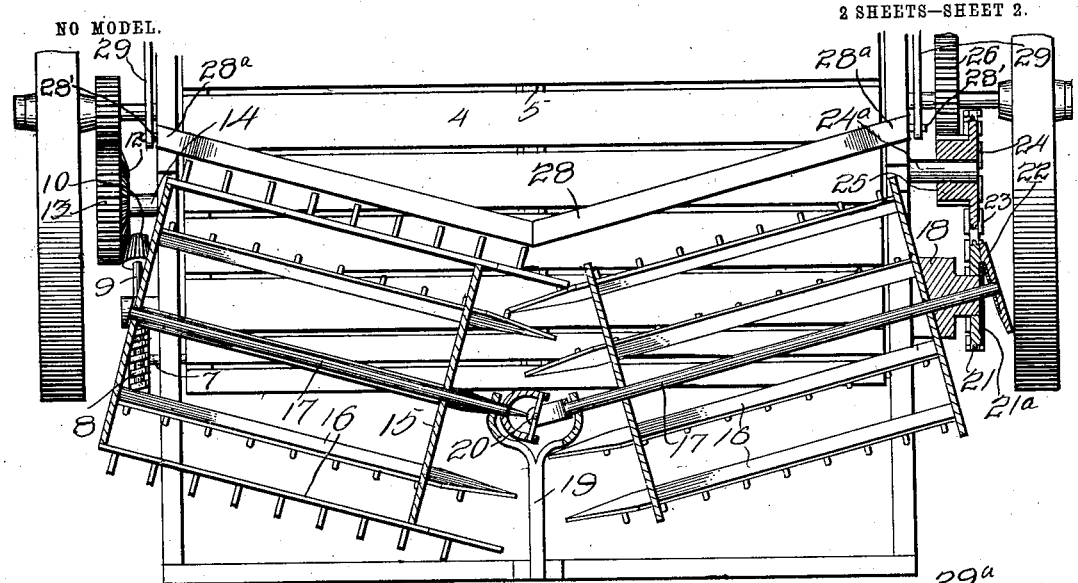
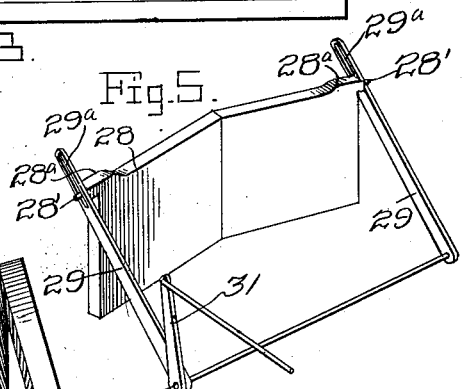
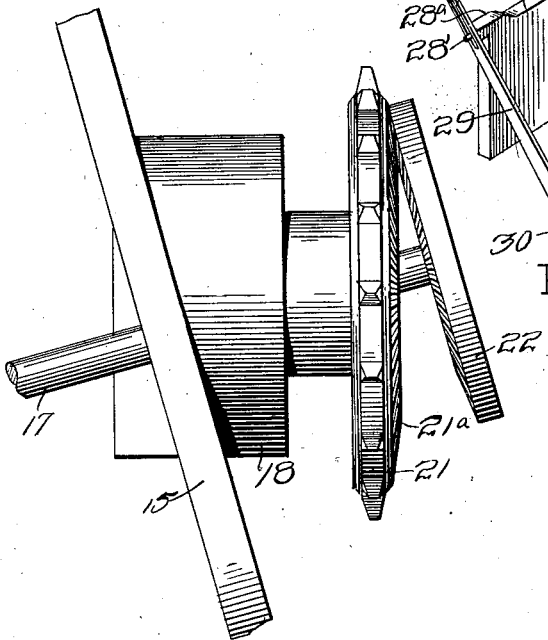

No. 744,184. Patented November 17, 1903.

UNITED STATES PATENT OFFICE.

FRANK F. FREED, OF FISHERSVILLE, VIRGINIA.

MANURE-SPREADER.

SPECIFICATION forming part of Letters Patent No. 744,184, dated November 17, 1903.

Application filed March 16, 1903. Serial No. 148,049. (No model.)

*To all whom it may concern:*

Be it known that I, FRANK F. FREED, a citizen of the United States, residing at Fishersville, in the county of Augusta and State of Virginia, have invented certain new and useful Improvements in Manure-Spreaders; and I do declare the following to be a full, clear, and exact description of the invention, such as will enable others skilled in the art to which it appertains to make and use the same.

This invention relates to improvements in manure-spreaders in which the manure or other fertilizer is thrown out from the rear of a wheeled carrier and scattered broadcast or spread over the ground.

The primary object of the invention is to provide a machine of this character whereby a much wider throw or delivery is given to the manure than is usually given by such machines, which ordinarily spread only the width of the vehicle body or bed.

A further object is to construct such a machine which will be simple, strong, and durable, efficient, and well adapted to the use for which it is designed.

With these and other objects in view the machine consists in the construction, combination, and arrangement of the parts, as will be hereinafter more fully described, reference being had to the accompanying drawings, in which—

Figure 1 is a top plan view of a manure-spreader embodying the invention. Fig. 2 is a side elevation of the same. Fig. 3 is an enlarged horizontal sectional view of the rear end of the spreader on the line of the beater-shafts. Fig. 4 is an enlarged detail plan view of the beater driving-gear. Fig. 5 is a detail view of the tail-gate and its operating-levers.

In the drawings, 1 denotes the body or bed of the vehicle.

2 denotes the rear supporting-wheels; 3, the front supporting-wheels.

4 denotes the slatted bottom, supported centrally and fixed to an endless sprocket-chain 5, which passes over front and rear sprocket-wheels mounted upon transverse shafts 6 and 7, journaled in bearings on the wagon-bed.

On one end of the rear shaft 7 is fixed a worm-gear which meshes with and is driven by a worm 8 on the end of a longitudinal shaft 9, journaled in bearings on one side of the wagon-body, said shaft 9 having fixed to its opposite end a bevel-gear 10, which meshes with a similar beveled gear 12, which is fixed to or integral with a spur-gear 13, mounted upon a short stub-shaft 14, projecting from the wagon bed or body. The gear 13 is in mesh with a similar spur-gear fixed upon the rear supporting-axle $3^a$, which axle is adapted to be rotated as the vehicle is propelled. By means of the gearing just described the slatted bottom is drawn rearwardly, as will be understood, to feed off the load.

A crank-handle 6' may be connected to one end of the front shaft 6, whereby the endless chain and slatted bottom may be drawn back when the load has been discharged. The ends of the slats forming the bottom are linked or hinged together as usual and are adapted to be supported and slide upon rollers arranged along the inner lower edges of the wagon bed or body.

The parts of the machine hereinbefore described may be of the usual or any approved construction and do not form part of the present invention.

15 denotes beaters arranged above the bottom of the vehicle at the rear end of the same. The beaters 15 consist of a series of toothed slats 16, spaced apart and supported near their ends upon circular supporting wheels or bands fixed upon rotary shafts 17. The shafts 17 are arranged diagonally across the rear end of the vehicle with their inner ends nearer the end of the vehicle, as shown. The outer ends of said shafts are mounted in bearings 18, fixed to the outer sides of the wagon-bed, while the inner ends of the same are journaled in the forked members of a centrally-arranged supporting standard or bracket 19.

The inner ends of the diagonally-arranged shafts are connected together by means of a universal joint 20, thus forming a practically continuous flexible shaft. The inner ends of the beaters are adapted to project and rotate one within the other.

One of the side bearings 18 is extended to form a sleeve, upon which is loosely mounted to rotate a sprocket-wheel 21, provided on its outer face with bevel-gear teeth $21^a$. On the adjacent end of the shaft 17 is fixed a bevel-gear 22, the teeth of which are adapted to mesh with the beveled teeth 21ª on sprocket-wheel 21. A sprocket-chain 23 connects the wheel 21 with a sprocket-wheel 24, rotatably mounted upon a stud shaft or arbor 24ª, fixed to the side of the wagon-bed. A spur-pinion 25 is fixed to or integral with the sprocket-wheel 24 and is in mesh with a spur-gear 26, fixedly mounted upon the rear axle 3ª of the wagon. Thus it will be seen that as the vehicle is drawn across a field the rear axle will be rotated by the rear wheels which are fixed thereto, and motion will thereby be imparted to the gear 26 and thence through the intervening gearing to the beater-shaft, as will be readily understood.

27 denotes a front board or follower fixed upon the forward end of the slatted bottom, the same being constructed of diagonally-arranged boards to conform to the angle formed by the diagonally-arranged beaters, this shape being given to the board 27 so that all the load may be discharged as the said board moves back to the beaters. A similarly shaped and constructed tail-gate 28 is arranged at the rear end of the wagon-body just in front of and in juxtaposition to the beaters and is mounted to slide up and down between the side-boards of the wagon-body and provided at its ends with upper lateral lugs or extensions 28ª, which extend over and beyond the said side-boards and carry pins 28'. The gate may be raised when it is desired to discharge the load by means of levers 29, each having one end formed with an elongated slot 29ª to receive the pin 28' and having its opposite end fixed to a rock-shaft 30, transversely disposed in bearings on or beneath the wagon-bed. The slot-and-pin connection 29ª and 28' forms, it will be understood, a loose connection between each lever 29 and the gate to allow the latter to move vertically on the arcuate swing of the levers 29. To one end of the rock-shaft 30 is fixed a crank-arm 31, which is connected by a rod or link 31ª to an operating-lever 32, arranged at the front end of the wagon near the driver's seat. Upon swinging this lever 32 forward the shaft 30 will be rocked and the arms 29 swung upwardly and forwardly, thus causing the gate 28 to slide vertically upward, the difference in the movements of the arms and gate being compensated for by the pins 28' and slots 29ª. Upon the release of the lever the gate will close by gravity, as will be readily understood. Thus the tail-gate may be readily opened and closed by the driver from his position on the driver's seat.

The advantages claimed to be derived from the diagonal arrangement of the beaters are that the manure is thrown out laterally as well as rearwardly, thus covering a much wider space or path than would be covered by a single transversely-arranged beater, which would feed out only to the width of the wagon bed or body, the field being much more quickly covered by the former arrangement than by the latter. Furthermore, in the diagonal arrangement of the beaters, the end of one of which is adapted to work within the end of the other, the feeding will be uniform throughout the width of the spread and no middle path will be skipped or left uncovered.

The inner ends of the slats of the beaters are shown as being tapered, this being to permit the said ends to freely pass between each other when rotating without interfering.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a machine of the character described, the combination of a wheeled body having a movable slatted bottom, of a pair of diagonally-arranged beaters having centrally-disposed supporting-shafts, a universal-joint connection between the inner ends of said beater-shafts whereby motion of one is imparted to the other, a bevel-gear fixed to the outer end of one of said beater-shafts, a loosely-mounted bevel-gear meshing with said fixed gear, a sprocket-wheel fixed to said loosely-mounted bevel-gear, a combined sprocket-wheel and spur-pinion loosely mounted upon a fixed arbor, a sprocket-chain connecting said sprocket-wheels, and a master-gear fixed upon the rear supporting-shaft of said body and in mesh with said combined spur-pinion and sprocket-wheel whereby said gearing is actuated to drive said beater-shafts and beaters, substantially as described.

2. In a machine of the character described, the combination with a wheeled body having a movable slatted bottom, of a pair of diagonally-arranged beaters, means for rotating said beaters, a substantially V-shaped rearwardly-moving front follower, a substantially V-shaped tail-gate arranged at the rear end of said body and adapted to be raised and lowered, and means for raising and lowering said tail-gate, substantially as described.

In testimony whereof I have hereunto set my hand in presence of two subscribing witnesses.

FRANK F. FREED.

Witnesses:
J. N. KERR,
MONTAGUE PAYNE.